US008904640B2

(12) United States Patent
Murray

(10) Patent No.: US 8,904,640 B2

(45) Date of Patent: Dec. 9, 2014

(54) AIR EXTRACTION MANUFACTURING METHOD

(75) Inventor: Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 265 days.

(21) Appl. No.: 13/305,812

(22) Filed: Nov. 29, 2011

(65) Prior Publication Data

US 2013/0133200 A1 May 30, 2013

(51) Int. Cl.

| | |
|---|---|
| ***B21D 53/76*** | (2006.01) |
| ***B23P 17/00*** | (2006.01) |
| ***B41J 2/135*** | (2006.01) |

(52) U.S. Cl.

USPC .......... 29/890.1; 347/44

(58) Field of Classification Search

CPC ...... B41J 2/1603; B41J 2/1626; B41J 2/1631; B41J 2/1623

USPC .......... 29/890.1; 347/44

See application file for complete search history.

(56) References Cited

U.S. PATENT DOCUMENTS

| | | | | |
|---|---|---|---|---|
| 6,116,716 | A * | 9/2000 | Tajika et al. | 347/19 |
| 6,116,726 | A * | 9/2000 | Driggers | 347/87 |
| 6,378,971 | B1 * | 4/2002 | Tamura et al. | 347/7 |
| 6,457,820 | B1 * | 10/2002 | Cai et al. | 347/92 |
| 8,141,997 | B2 * | 3/2012 | Gengrinovich et al. | 347/85 |
| 8,449,092 | B1 * | 5/2013 | Murray | 347/87 |
| 8,454,145 | B1 * | 6/2013 | Murray | 347/87 |
| 2011/0209706 | A1 * | 9/2011 | Truschel et al. | 128/204.23 |

OTHER PUBLICATIONS

Co-pending U.S. Appl. No. 13/095,998, filed Apr. 28, 2011, titled "Air Extraction Piston Device for Inkjet Printhead"; of Richard A. Murray.

* cited by examiner

*Primary Examiner* — David Angwin

(74) *Attorney, Agent, or Firm* — Eugene I Shkwko; Amit Singhai

(57) ABSTRACT

A method of making an ink cartridge by forming an ink chamber, an air accumulation chamber, and a cap including a vent hole is disclosed. The cap is affixed at a first end of the air accumulation chamber and a one way valve is disposed at the vent hole for preventing gas from entering the air accumulation chamber through the vent hole when a pressure in the air accumulation chamber is less than a cracking pressure of the one-way valve. A neck region narrower than the ink chamber and the air accumulation chamber is formed for fluidically connecting the ink chamber and the air accumulation chamber. A mass is placed within the air accumulation chamber, the mass having a dimension smaller than an interior dimension of the air accumulation chamber such that the mass is movable between the first end and a second end of the air accumulation chamber.

19 Claims, 9 Drawing Sheets

AIR EXTRACTION MANUFACTURING METHOD

CROSS REFERENCES TO RELATED APPLICATIONS

U.S. patent application Ser. No. 13/305,849 entitled "Air Extraction Momentum Method," filed concurrently herewith (now U.S. Pat. No. 8,449,092), and U.S. patent application Ser. No. 13/305,828 entitled "Air Extraction Momentum Pump for Inkjet Printhead," filed concurrently herewith (now U.S. Pat. No. 8,454,145) are assigned to the same assignee hereof, Eastman Kodak Company of Rochester, N.Y., and contain subject matter related, in certain respect, to the subject matter of the present application. The above-identified patent applications are incorporated herein by reference in their entirety.

FIELD OF THE INVENTION

This invention relates generally to the field of inkjet printing, and in particular to an air extraction device for removing air from the printhead while in the printer.

BACKGROUND OF THE INVENTION

An inkjet printing system typically includes one or more printheads and their corresponding ink supplies. A printhead includes an ink inlet that is connected to its ink supply and an array of drop ejectors, each ejector including an ink pressurization chamber, an ejecting actuator and a nozzle through which droplets of ink are ejected. The ejecting actuator may be one of various types, including a heater that vaporizes some of the ink in the chamber in order to propel a droplet out of the nozzle, or a piezoelectric device that changes the wall geometry of the ink pressurization chamber in order to generate a pressure wave that ejects a droplet. The droplets are typically directed toward paper or other print medium (sometimes generically referred to as recording medium or paper herein) in order to produce an image according to image data that is converted into electronic firing pulses for the drop ejectors as the print medium is moved relative to the printhead.

Motion of the print medium relative to the printhead can include keeping the printhead stationary and advancing the print medium past the printhead while the drops are ejected. This architecture is appropriate if the nozzle array on the printhead can address the entire region of interest across the width of the print medium. Such printheads are sometimes called pagewidth printheads. A second type of printer architecture is the carriage printer, where the printhead nozzle array is somewhat smaller than the extent of the region of interest for printing on the print medium and the printhead is mounted on a carriage. In a carriage printer, the print medium is advanced a given distance along a print medium advance direction and then stopped. While the print medium is stopped, the printhead carriage is moved in a carriage scan direction that is substantially perpendicular to the print medium advance direction as the drops are ejected from the nozzles. After the carriage has printed a swath of the image while traversing the print medium, the print medium is advanced, the carriage direction of motion is reversed, and the image is formed swath by swath.

Inkjet ink includes a variety of volatile and nonvolatile components including pigments or dyes, humectants, image durability enhancers, and carriers or solvents. A key consideration in ink formulation and ink delivery is the ability to produce high quality images on the print medium. Image quality can be degraded if air bubbles block the small ink passageways from the ink supply to the array of drop ejectors. Such air bubbles can cause ejected drops to be misdirected from their intended flight paths, or to have a smaller drop volume than intended, or to fail to eject. Air bubbles can arise from a variety of sources. Air that enters the ink supply through a non-airtight enclosure can be dissolved in the ink, and subsequently be exsolved (i.e. come out of solution) from the ink in the printhead at an elevated operating temperature, for example. Air can also be ingested through the printhead nozzles. For a printhead having replaceable ink supplies, such as ink tanks, air can also enter the printhead when an ink tank is changed.

In a conventional inkjet printer, a part of the printhead maintenance station is a cap that is connected to a suction pump, such as a peristaltic or tube pump. The cap surrounds the printhead nozzle face during periods of nonprinting in order to inhibit evaporation of the volatile components of the ink. Periodically, the suction pump is activated to remove ink and unwanted air bubbles from the nozzles. This pumping of ink through the nozzles is not a very efficient process and wastes a significant amount of ink over the life of the printer. Not only is ink wasted, but in addition, a waste pad must be provided in the printer to absorb the ink removed by suction. The waste ink and the waste pad are undesirable expenses. In addition, the waste pad takes up space in the printer, requiring a larger printer volume. Furthermore the waste ink and the waste pad must be subsequently disposed. Also, the suction operation can delay the printing operation Co-pending U.S. Patent Application Publication No. 2011/0209706 entitled "Air Extraction Device for Inkjet Printhead" discloses an inkjet printhead including an air extraction chamber having a compressible member for forcing air to be vented from an air chamber through a one-way relief valve in its open position, and for applying a reduced air pressure to a membrane while the one-way relief valve is in its closed position. The compressible member, for example a bellows, is compressed by a projection from a wall of the printer when the carriage moves to an end of travel. Co-pending U.S. patent application Ser. No. 13/095,998 filed on Apr. 28, 2011, is a related design that uses a piston assembly rather than a compressible member, the piston being moved to a first position by a projection from a wall of the printer when the carriage moves to an end of travel. Both of these air extraction devices are actuated by moving the carriage to an end of travel. Both of these copending patent applications are incorporated by reference herein in their entireties.

U.S. Pat. No. 6,116,726, entitled "Ink Jet Printer Cartridge with Inertially-Driven Air Evacuation Apparatus and Method", discloses an inkjet printhead (or pen) including a movable inertia element connected to the body of the printhead. The body defines an ink chamber and an air outlet. A compressor element is connected to the inertia element and the air outlet. When the printhead is accelerated along the carriage path during printing, the resulting motion of the inertia element operates the compressor to pump a small amount of air from the chamber. Such a pump is actuated as the carriage moves back and forth during the normal printing process and does not require the carriage to move to an end of travel in order to encounter a projection from a carriage wall. However, the design of the compressor element is somewhat complex.

What is needed is an air extraction device for an inkjet printhead that is actuated as the carriage moves back and forth during the normal printing process, but has a simpler design.

SUMMARY OF THE INVENTION

A preferred embodiment of the present invention comprises a method of making an ink cartridge by forming the ink cartridge with an ink chamber and an air accumulation chamber, forming a vent hole at a first end of the air accumulation chamber, and disposing a one way valve at the vent hole for preventing gas from entering the air accumulation chamber through the vent hole. A narrower a neck region fluidically connects the ink chamber and the air accumulation chamber within the ink cartridge. A mass is placed within the air accumulation chamber, the mass having a dimension smaller than an interior dimension of the air accumulation chamber such that the mass is movable between the first end and a second end of the air accumulation chamber. The mass has a dimension greater than the neck region for preventing the mass from entering the ink chamber. The mass comprises an average density of less than two grams per cubic centimeter and has a through-hole such that a first end of the through-hole faces the first end of the air accumulation chamber and a second end of the through-hole faces the second end of the air accumulation chamber. A one way valve at the first end of the through-hole prevents gas from entering the through-hole through the first end of the through hole.

Another preferred embodiment of the present invention comprises a method of making an ink cartridge by forming an ink cartridge having a first chamber for holding ink and a second chamber smaller than the first chamber for holding a smaller portion of the ink and for holding air, including forming a neck region for fluidically connecting the first chamber and the second chamber. A vent hole is formed at a first end of the first chamber for evacuating a portion of the air.

A mass is disposed within the first chamber and has a dimension smaller than an interior dimension of the first chamber such that the mass is movable between the first end and a second end of the first chamber. It is also large enough such that air is forced out of the vent hole when the mass moves in a direction toward the first end of the first chamber. The neck region is formed proximate the second end of the first chamber so that there is enough air space in the first chamber between the first end of the mass and the vent hole to capture air to be forced out of the vent hole when the mass moves toward the vent hole. The mass has a through hole and a one way valve at a first end of the through-hole for preventing gas from entering the through-hole through the first end of the through hole. The vent hole also has a one way valve for preventing air from entering the first chamber through the vent hole. A density of the ink and the mass has the following relationship: if the ink comprises a density $d_i$ grams/cm$^3$, then the mass is formed such that the mass has an effective density $d_m$ grams/cm$^3$, wherein $0.8d_i<d_m<1.2d_i$.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. It is to be understood that the attached drawings are for purposes of illustrating the concepts of the invention. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE INVENTION

Figure 1:
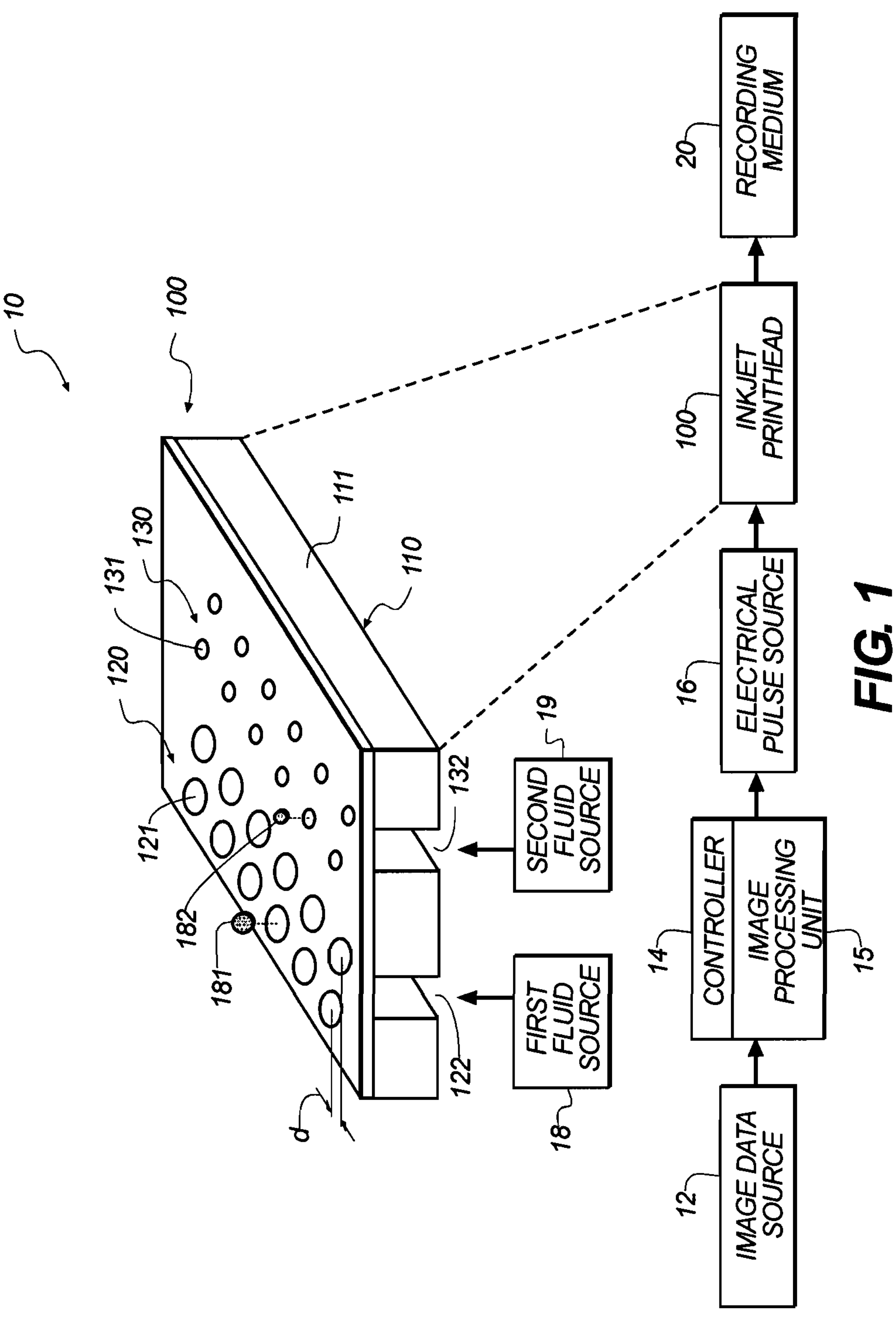
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, which is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110. Inkjet printhead die 110 are sometimes interchangeably called ejector die herein.

In the example shown in FIG. 1, there are two nozzle arrays. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both the first nozzle array 120 and the second nozzle array 130 via ink delivery pathways 122 and 132 respectively. Also, in some embodiments, fewer than two or more than two nozzle arrays can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20. As the nozzles are the most visible part of the drop ejector, the terms drop ejector array and nozzle array will sometimes be used interchangeably herein.

Figure 2:
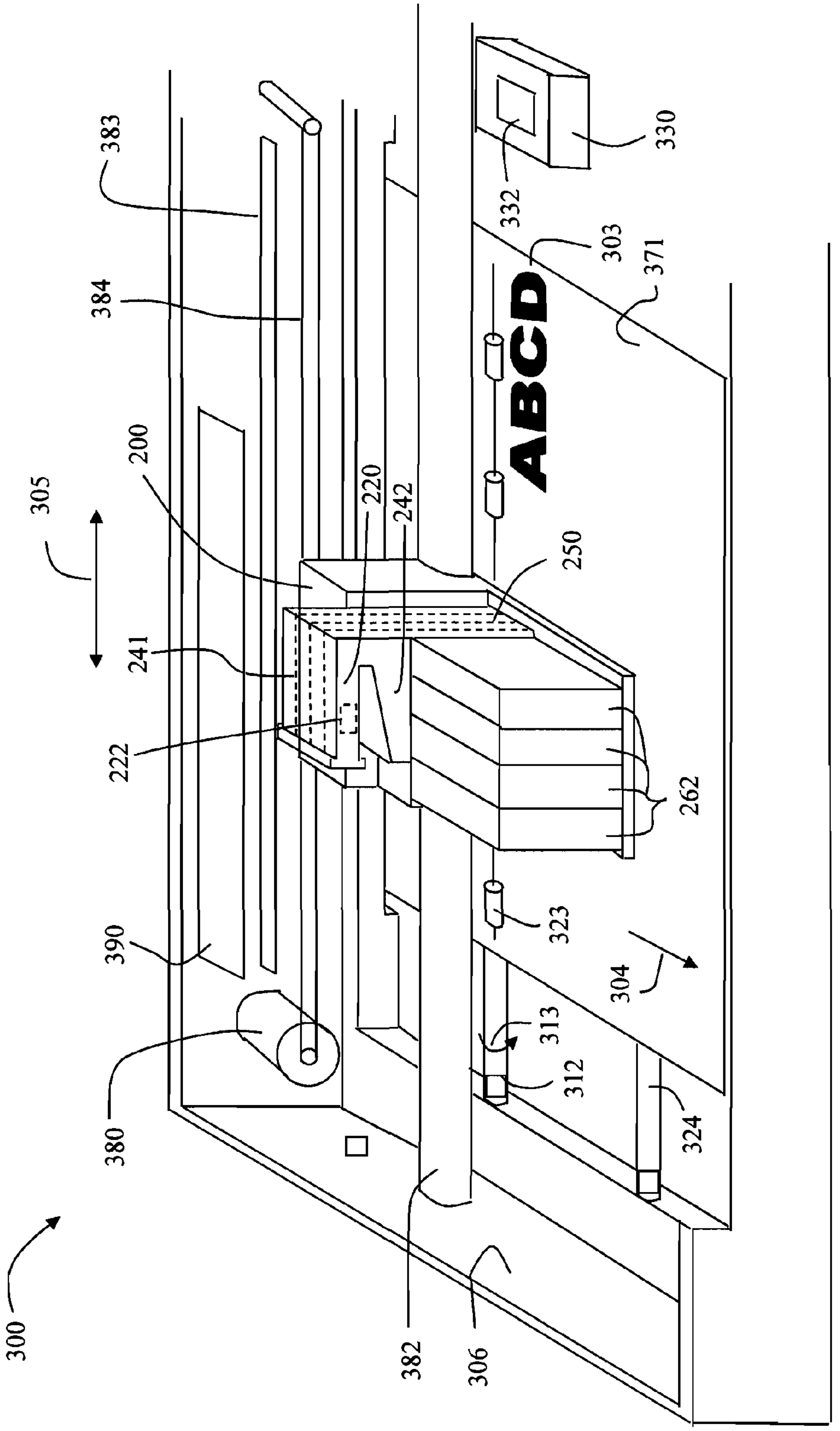
FIG. 2 is a schematic perspective of a portion of a carriage printer according to an embodiment of the invention.

FIG. 2 shows a schematic perspective of a portion of a desktop carriage printer according to an embodiment of the invention. Some of the parts of the printer have been hidden in the view shown in FIG. 2 so that other parts can be more clearly seen. Printer chassis 300 has a print region 303 across which carriage 200 is moved back and forth in reciprocative fashion along carriage scan direction 305, while drops of ink are ejected from printhead 250 that is mounted on carriage 200. Near the end of each printing swath, carriage 220 is decelerated, stopped, and accelerated in the opposite direction to reach a printing velocity in the opposite direction. The magnitude of the carriage acceleration is typically between 1 g and 3 g, where g is the acceleration due to gravity. The letters ABCD indicate a portion of an image that has been printed in print region 303 on a piece 371 of paper or other recording medium. Carriage motor 380 moves belt 384 to move carriage 200 along carriage guide rod 382. An encoder sensor (not shown) is mounted on carriage 200 and indicates carriage location relative to an encoder 383.

Printhead 250 is mounted on carriage 200, and ink tanks 262 are mounted to supply ink to printhead 250, and contain inks such as cyan, magenta, yellow and black, or other recording fluids. Optionally, several ink tanks can be bundled together as one multi-chamber ink supply, for example, cyan, magenta and yellow. Inks from the different ink tanks 262 are provided to different nozzle arrays, as described in more detail below.

A variety of rollers are used to advance the recording medium through the printer. In the view of FIG. 2, feed roller 312 and passive roller(s) 323 advance piece 371 of recording medium along media advance direction 304, which is substantially perpendicular to carriage scan direction 305 across print region 303 in order to position the recording medium for the next swath of the image to be printed. Discharge roller 324 continues to advance piece 371 of recording medium toward an output region where the printed medium can be retrieved. Star wheels (not shown) hold piece 371 of recording medium against discharge roller 324.

Typical lengths of recording media are 6 inches for photographic prints (4 inches by 6 inches) or 11 inches for paper (8.5 by 11 inches). Thus, in order to print a full image, a number of swaths are successively printed while moving printhead chassis 250 across the piece 371 of recording medium. Following the printing of a swath, the recording medium 20 is advanced along media advance direction 304. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller 312. The motor that powers the paper advance rollers, including feed roller 312 and discharge roller 324, is not shown in FIG. 2. For normal paper feeding feed roller 312 and discharge roller 324 are driven in forward rotation direction 313.

Toward the rear of the printer chassis 300, in this example, is located the electronics board 390, which includes cable connectors for communicating via cables (not shown) to the printhead carriage 200 and from there to the printhead 250. Also on the electronics board are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Toward the right side of the printer chassis 300, in the example of FIG. 2, is the maintenance station 330. Maintenance station 330 can include a wiper (not shown) to clean the nozzle face of printhead 250, as well as a cap 332 to seal against the nozzle face in order to slow the evaporation of volatile components of the ink. Many conventional printers include a vacuum pump attached to the cap in order to suck ink and air out of the nozzles of printhead when they are malfunctioning.

A different way to remove air from the printhead 250 is shown in FIG. 2 and discussed in more detail below relative to embodiments of the present invention. Printhead 250 includes one or more air accumulation chambers 220 in which is disposed a movable mass 222. An ink chamber 242 is connected to each air accumulation chamber 220. Internal walls 241 (represented by dashed lines) provide separation between adjacent ink chambers 242. Four ink chambers 242 are shown in the example of FIG. 2, corresponding to cyan, magenta, yellow and black inks. Similarly, four ink tanks 262 are shown. However, in other examples, there can be more than four ink chambers 242 or fewer than four ink chambers 242.

Figure 3:
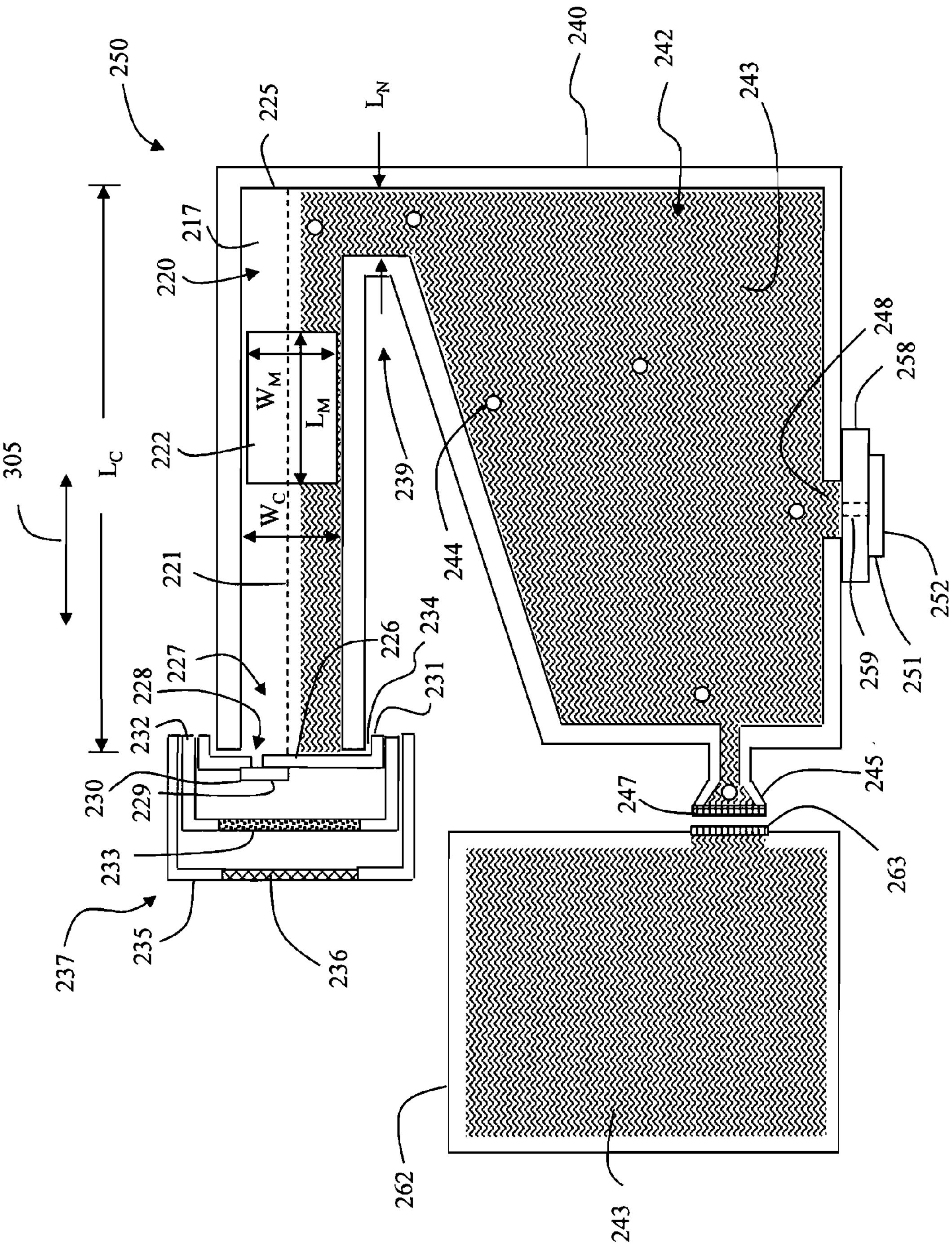
FIG. 3 shows a cross-section of a printhead according to an embodiment of the invention.

FIG. 3 shows a cross-section of a printhead 250 similar to the printhead 250 shown in FIG. 2, where the cross-section is through a plane parallel to an internal wall 241. Inkjet printhead 250 includes a printhead body 240 and a printhead die 251 (that is, an ejector die). Printhead body includes an ink chamber 242 containing an ink 243. Ink chamber 242 includes an ink inlet port 245 and an ink outlet 248 that is fluidically connected to printhead die 251. Printhead body also includes an air accumulation chamber 220 having a chamber axis 221. Preferably, chamber axis 221 is parallel to carriage scan direction 305 when printhead 250 is mounted on carriage 200 (see FIG. 2). Near one end 227 of air accumulation chamber 220 is an air vent opening 228. Inside air accumulation chamber is a mass 222 that is movable along chamber axis 221 toward and away from the end 227 that is near air vent opening 228. A neck region 239 connects ink chamber 242 and air accumulation chamber 220, so that ink 243 is typically in the ink chamber, the neck region 239 and the air accumulation chamber 220. An air space 217 is located above the level of the ink 243 in the air accumulation chamber 220.

An ink source such as ink tank 262 is fluidically connected to printhead body 240 at ink inlet port 245 in order to replenish ink 243 in ink chamber 242 to replace ink that is used during printing. The ink source typically includes a pressure regulation mechanism (not shown) in order to keep ink 243 at a sufficiently negative pressure that it does not drool out the nozzles (not shown) in nozzle face 252. As ink 243 exits ink chamber 243 through ink outlet 248, the volume of air space 217 increases, thereby reducing the air pressure in air space 217. This reduced air pressure draws ink 243 from the ink source (such as replaceable ink tank 262 that is mountable on printhead 250) through ink outlet port 263 that mates with ink inlet port 245 in order to replenish the ink 243 in ink chamber 242 and air accumulation chamber 220. Typically a porous filter 247 is disposed at the entry to ink inlet port 245.

Although a replaceable ink tank 262 is one type of ink source, alternatively an off-axis ink source (not shown) that is stationarily mounted on the printer chassis 300 (FIG. 2) can be fluidically connected to ink chamber 243 via flexible tubing (not shown). Also, although ink inlet port 245 is shown in FIG. 3 as extending outwardly from printhead body 240 along carriage scan direction 305 near a lower region of printhead body 240 close to ink outlet 248, in other examples, ink inlet port 245 can extend outwardly from printhead body 240 out of the plane of FIG. 3, or in other directions. In other examples, ink inlet port 245 can be located closer to air accumulation chamber 220 than to ink outlet 248. In some examples, ink tank 262 can be mounted on top of air accumulation chamber 220.

In FIG. 3, air bubbles 244 are shown as rising both from ink outlet 248 and from ink inlet port 245 of printhead 250. Air bubbles 244 originating at ink outlet 248 can come, for example, from printhead die 251 due to air ingested through the nozzles or to air coming out of solution from the ink 243 at elevated temperatures. Air bubbles 244 originating at inlet ports 245 can enter, for example, during the changing of ink tanks 262. As discussed below, the movable mass 222 in air accumulation chamber 220 is effective in removing air due to various sources in printhead 250. The open vertical geometry of ink chamber 242, leading to an air space 217 above ink 243 in air accumulation chamber 220, facilitates the free rising of air bubbles 244 through ink 243, due to their buoyancy, toward the air space 217. With a porous filter 247 disposed at the ink inlet port 245, no additional filter is typically required along an ink path between the air accumulation chamber 220 and the ink outlet 248 of the ink chamber 248. Thus, the rising of air bubbles is not hindered as it would be by the fine mesh screen (42) in FIG. 2 of U.S. Pat. No. 6,116,726, described in the Background section herein.

Further details will now be provided in order to explain how excess air (from air bubbles 244) in air space 217 is removed from air accumulation chamber 220. Air accumulation chamber 220 includes a first wall 225 located near neck region 239 and a second wall 226 located opposite first wall 225. Air vent opening 228 is located in or near second wall 226. A one-way valve 229 covers air vent opening 228. In the example shown in FIGS. 3 and 4, one way valve 229 includes a flapper valve having a free end 230 that is located near the second wall 226 of the air accumulation chamber 220, and is outside the air accumulation chamber 220. Under normal conditions (FIG. 3), elastomeric restoring forces keep the free end 230 sealed against air vent opening 228, so that air does not enter or exit air vent opening 228. As mass 222 moves in a direction from first wall 225 toward second wall 226, the air pressure in the region between mass 222 and second wall 226 increases as the volume therein decreases. When the air pressure exceeds a cracking pressure of the one-way valve 229, the free end 230 is forced away from air vent opening 228 as in FIG. 4 and letting some air escape from air accumulation chamber 220. Then elastomeric restoring forces close the one-way valve 229 again (FIG. 3), so that air can no longer enter or exit air vent opening 228.

Mass 222 is moved back and forth along chamber axis 221 due to forces (inertia, momentum) arising from carriage acceleration and deceleration at least at both ends of carriage travel. The force on mass 222 will exceed the force on the ink 243 in air accumulation chamber 220, if the density of mass 222 is greater than the average density of the ink 243 and the air in air space 217. If the density of mass 222 is the same as the average density of ink 243 and air in air space 217, there will be no differential force to move mass 222 along chamber axis 221. Typically the density of mass 222 is on the order of the density of ink 243 that is on the order of 1 gram /$cm^3$. To keep the mass 222 from moving too quickly in air accumulation chamber 220 (tending to force ink out of air vent opening 228), the density or average density of mass 222 is typically less than 2 grams/$cm^3$.

A dimension of mass 222 is preferably greater than a dimension of neck region 239, thereby constraining the mass 222 from passing through neck region 239 and entering ink chamber 243. In the example of FIG. 3, length dimensions are indicated as being parallel to chamber axis 221 and width dimensions are indicated as being perpendicular to chamber axis 221. Length $L_N$ of neck region 239 is less than length $L_C$ of air accumulation chamber 220. Length $L_M$ of mass 222 is greater than length $L_N$ of neck region 239, but is less than length $L_C$ of air accumulation chamber 220. Width $W_M$ of mass 222 is less than width $W_C$ of air accumulation chamber 220, thereby providing a gap. It is not required that the seals between mass 222 and the walls of air accumulation chamber 220 be airtight. An air gap between mass 222 and the walls of air accumulation chamber 220 allows free movement of mass 222 without excessive pressure build-up.

Figure 4:
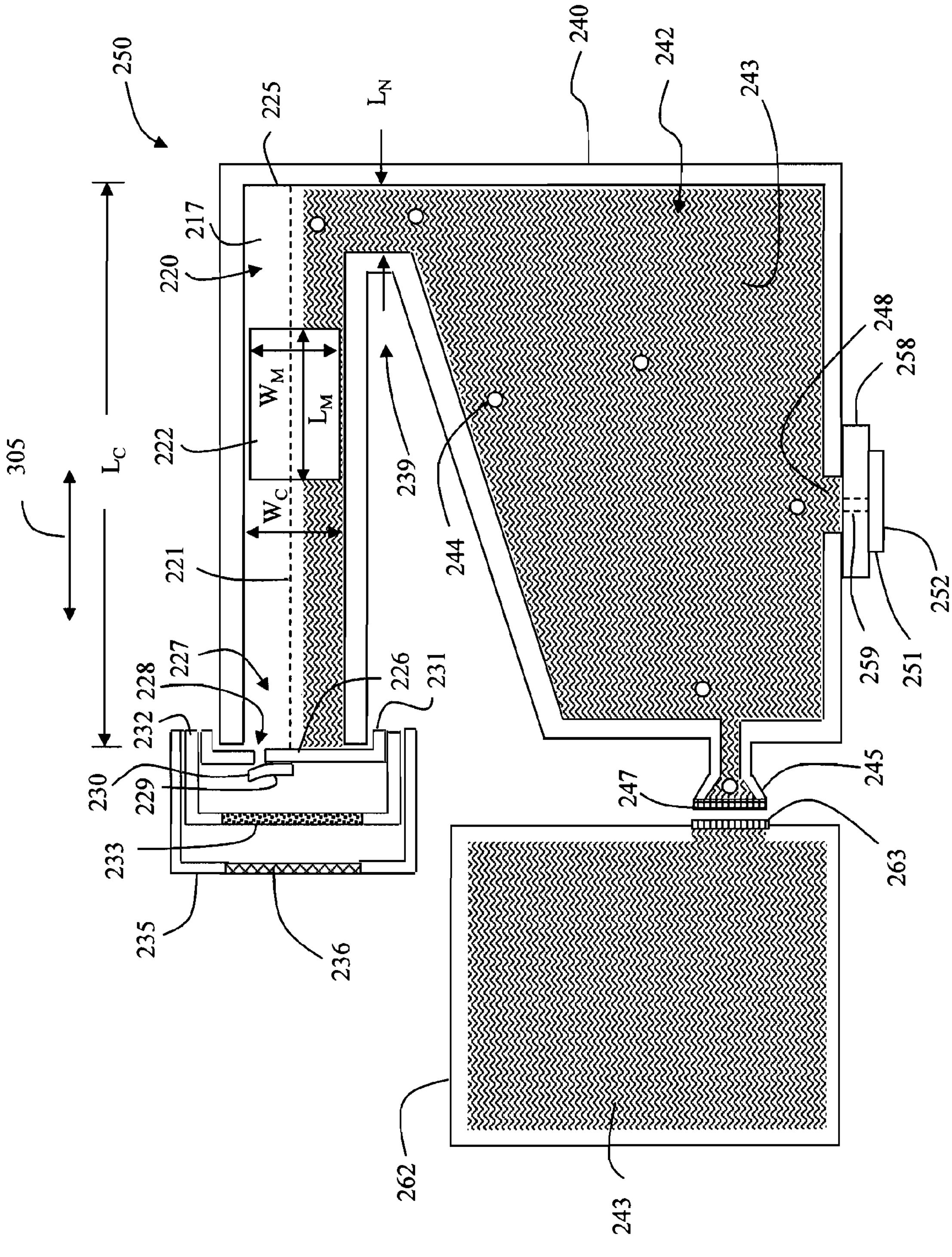
FIG. 4 shows a cross-section of the printhead of FIG. 3 with the one-way valve open over the air vent opening.
Figure 5:
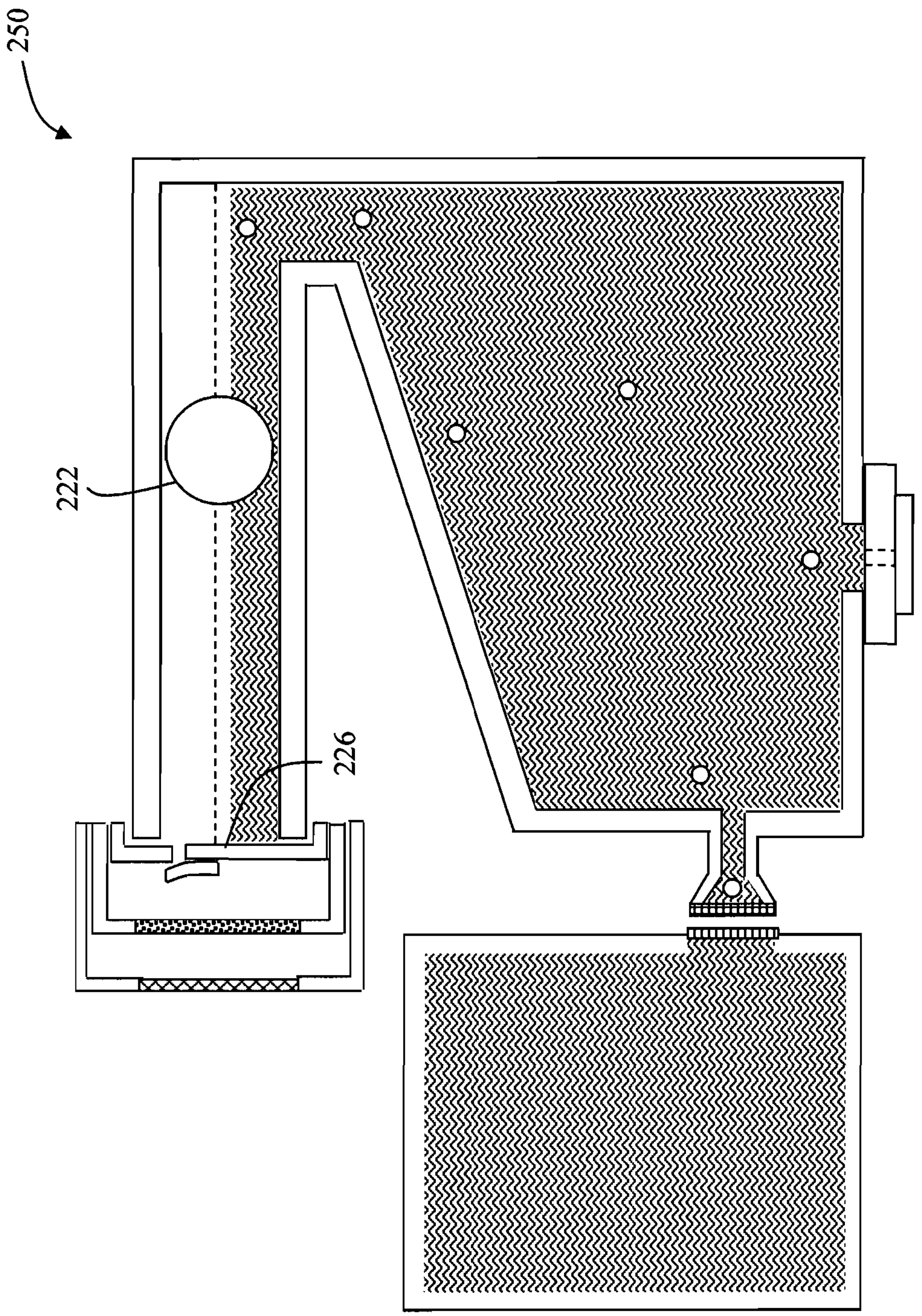
FIG. 5 shows a cross-section of a printhead according to another embodiment of the invention.

Mass 222 can have a variety of shapes, but it is typically advantageous for low friction travel along chamber axis 221 if mass 222 includes a circular cross-section in a plane perpendicular to chamber axis 221. In the example of FIGS. 3 and 4, it is advantageous if mass 222 has the shape of a right circular cylinder. In the example of printhead 250 in FIG. 5, mass 222 has the shape of a sphere.

Figure 6:
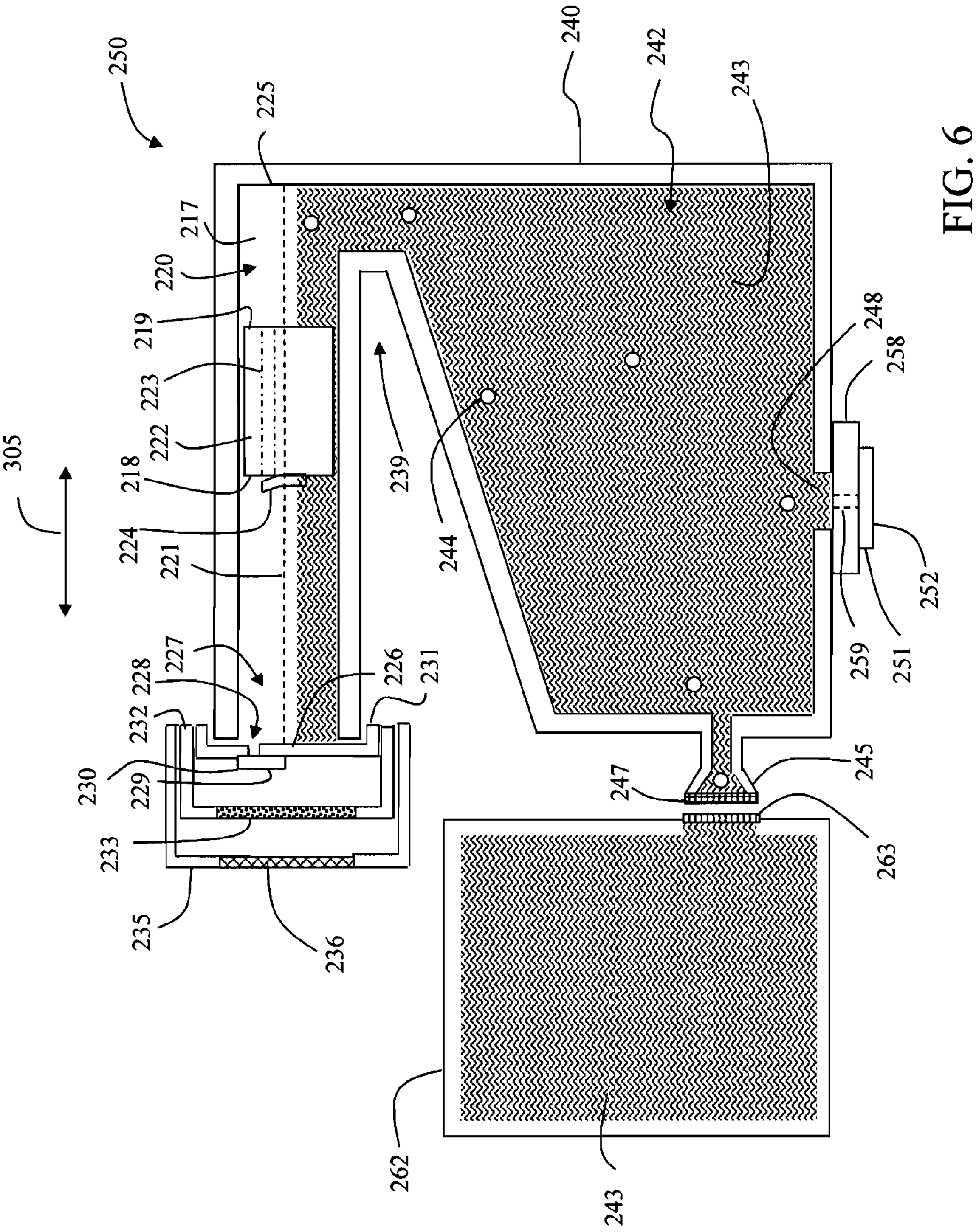
FIG. 6 shows a cross-section of a printhead according to yet another embodiment of the invention.

As described above relative to FIGS. 3 and 4, it is desirable to build up pressure in the region of air accumulation chamber 220 that is near air vent opening 228 in order to expel air through one way valve 229 as mass 222 moves toward the air vent opening 228. However, in some embodiments it is not desirable to build up pressure on the other side of mass 222, as mass 222 moves away from air vent opening 228. Such a buildup of pressure can cause an undesirable pressure surge toward ink outlet 248 and ink inlet port 245. FIG. 6 shows a cross-sectional view in which mass 222 includes a through hole 223 extending from a first face 218, which can be considered as a front face, that is proximate to air vent opening 228 (and distal to neck region 239) to a second face 219, which can be considered as a rear face, that is distal to air vent opening 228. Included on first face 218 is a one-way valve 224, such as a flapper valve. As mass 222 moves along chamber axis 221 toward air vent opening 228, one-way valve 224 is held in the closed position (e.g. by elastomeric forces) so that it seals against through hole 223. As a result, air and ink cannot flow through the through hole 223 when mass 222 moves toward air vent opening 228, so pressure can build up to open one-way valve 229 as in FIG. 4. However, as mass 222 moves along chamber axis 221 away from air vent opening 228, pressure that is built up in the region of air accumulation chamber 220 between second face 219 and wall 225 is relieved when the increased pressure causes one-way valve 224 on first face 218 of mass 222 to open, as shown in FIG. 6. Although the through hole 223 is shown as parallel to air chamber axis 221 in FIG. 6, and front face 218 and rear face 219 is shown as perpendicular to air chamber axis 221 therein, the air gap between mass 222 and the walls of air accumulation chamber 220 allows a slight tilting of mass 222 with respect thereto, and so these parallel and perpendicular relationships remain "substantially parallel" and "substantially perpendicular".

A mass 222 having a through hole 223 has an effective density that is an average of the density of solid material that mass 222 is made of and the density of the air or ink in through hole 223. If the ink has a density $d_i$ grams/cm$^3$, then for effective pumping, without over-pumping, it is desirable for the mass 222 to have an effective density of $d_m$ grams/cm$^3$, where $0.8d_i<d_m<1.2d_i$.

In the examples shown in FIG. 3, near the air vent opening 228 is a cap assembly 237. An inner cap 231 includes air vent opening 228 and one-way valve 229 covering the air vent opening 228. Inner cap 231 is affixed to air accumulation chamber 220 at interface 234. A second cap 232 is affixed over inner cap 231 and includes a breather membrane 233 through which air can readily pass, but through which ink cannot readily pass. Breather membrane 233 is outside air accumulation chamber 220. If some ink 243 is inadvertently forced through air vent opening 228, it can collect in the region between inner cap 231 and second cap 232. Breather membrane 233 is in a vertical orientation, so that ink tends to run off it and not degrade its permeability to air. One way valve 229 is disposed between breather membrane 233 and the interface 234 between inner cap 231 and air accumulation chamber 220. Outer cap 235 includes a tortuous vent path 236 that allows air to pass through to outside printhead 250, but would inhibit accumulated ink from dripping out if the printhead 250 were removed from carriage 200 (FIG. 2) and turned upside down.

Figure 7:
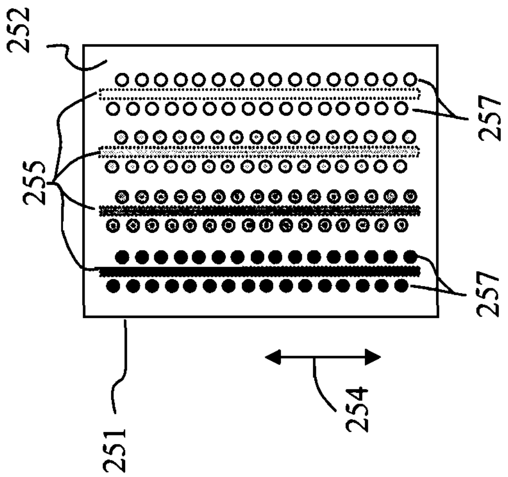
FIG. 7 shows a bottom view of a printhead die.

FIG. 7 shows a bottom view of printhead die 251 (i.e. ejector die). Nozzle arrays 257, included in nozzle face 252, are disposed along nozzle array direction 254 that is substantially parallel to media advance direction 304 (see FIG. 2) when printhead 250 is installed in carriage 200. Chamber axis 221 (see FIG. 3) is substantially parallel to nozzle face 252 and substantially perpendicular to array direction 254. Ink feed(s) 255 bring ink from mounting substrate ink passageway(s) 259 (see FIG. 3) to nozzle arrays 257.

Figure 8:
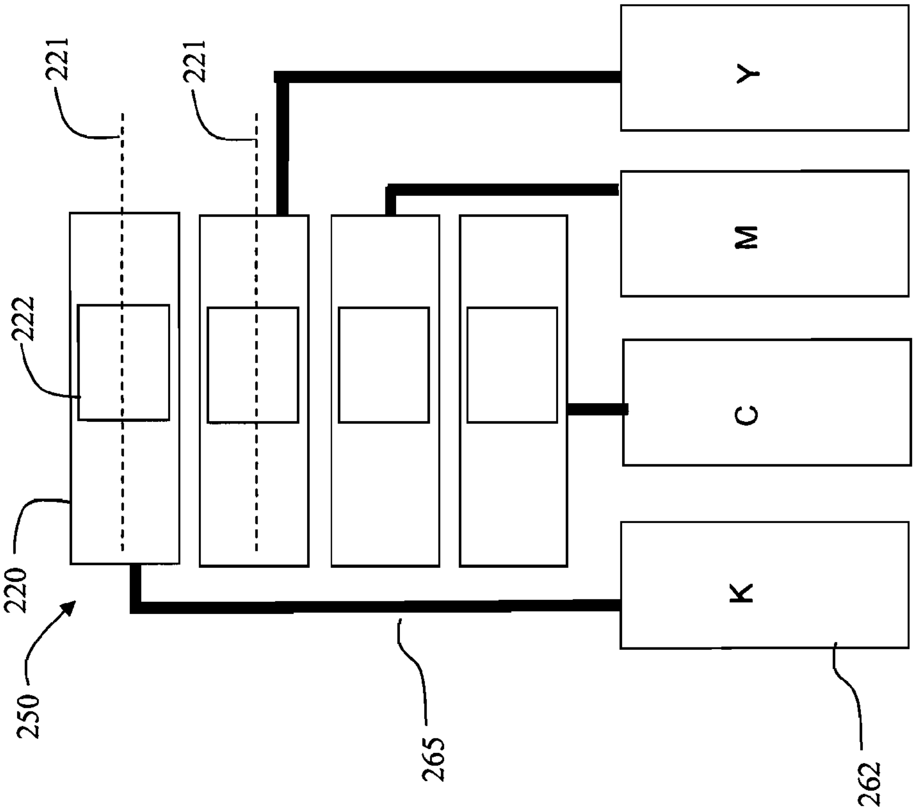
FIG. 8 shows a schematic top view of a configuration of ink tanks and a printhead having chambers having noncollinear chamber axes.
Figure 9:
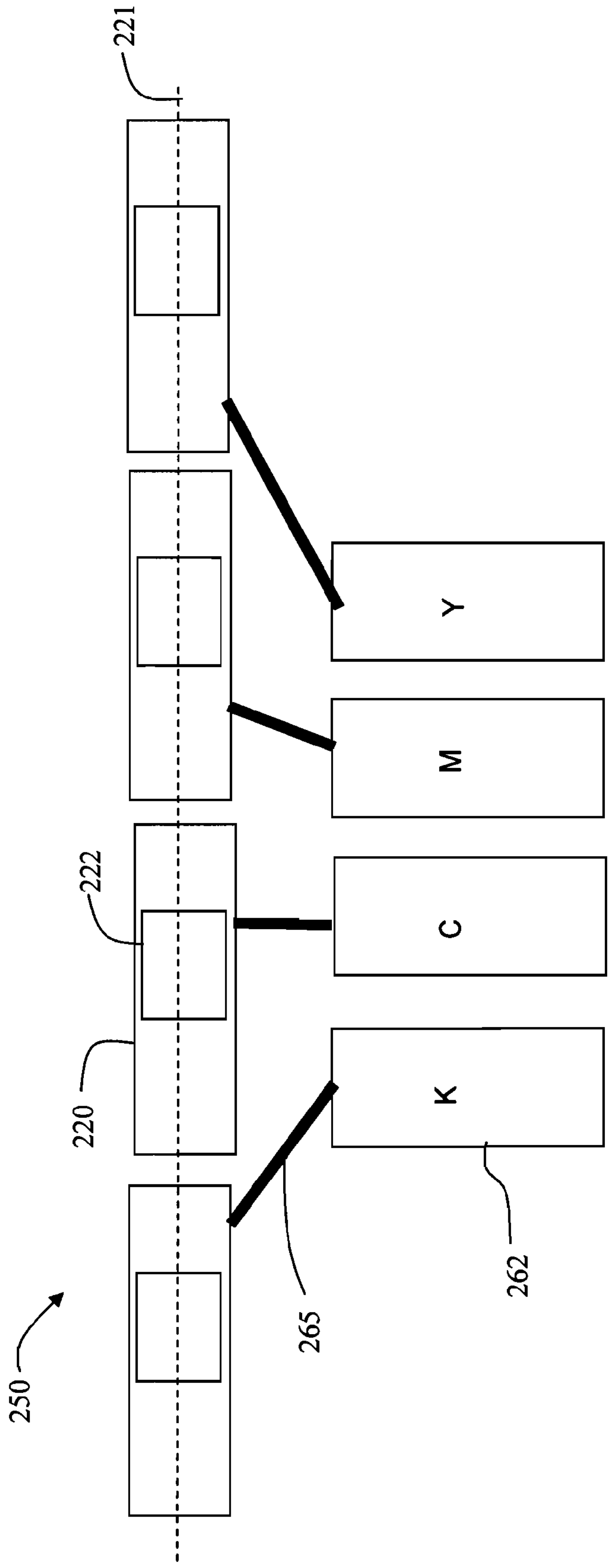
FIG. 9 shows a schematic top view of a configuration of ink tanks and a printhead having chambers having collinear chamber axes.

In FIG. 2, the ink connections between ink tanks 262 and ink chambers 242 are not visible. FIGS. 8 and 9 schematically show top views of two different configurations of ink connections. Ink chambers (not shown) and air accumulation chambers 220, are similar to those described above relative to FIG. 3, for example. FIG. 8 shows a configuration similar to that of FIG. 2 where there are a plurality of ink tanks 262 (designated K, C, M and Y for black, cyan, magenta and yellow inks) including air accumulation chambers 220, such that the different air accumulation chambers 220 have chamber axes 221 that are not collinear. Ink connection lines 265 bring ink from ink tanks 262 to corresponding chambers in printhead 250. By contrast, in the configuration shown in FIG. 9 the chamber axes 221 of different air accumulation chambers 220 are collinear.

Because embodiments of this invention extract air without extracting ink, less ink is wasted than in conventional printers. The waste ink pad used in conventional printers can be eliminated, or at least reduced in size to accommodate maintenance operations such as spitting from the jets. This allows the printer to be more economical to operate, more environmentally friendly and more compact. Furthermore, since the air extraction method of the present invention is done during printing, it is not necessary to delay printing operations to extract air from the printhead.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
217 Air space
218 First face (of mass)
219 Second face (of mass)
220 Air accumulation chamber
221 Chamber axis
222 Mass
223 Through hole
224 One-way valve (on first face of mass)
225 First wall
226 Second wall
227 End (of air accumulation chamber)
228 Air vent opening
229 One-way valve
230 Free end
231 Inner cap
232 Second cap
233 Breather membrane
234 Interface
235 Outer cap
236 Tortuous vent path
237 Cap assembly
239 Neck region
240 Printhead body
241 Internal wall
242 Ink chamber
243 Ink
244 Air bubble(s)
245 Ink inlet port
246 Ink outlet
247 Porous filter

248 Ink outlet
250 Printhead
251 Printhead die
252 Nozzle face
253 Nozzle array
254 Nozzle array direction
255 Ink feed
257 Nozzle array(s)
258 Mounting substrate
259 Mounting substrate passageway
262 Ink tank
263 Ink outlet port
265 Ink connection lines
300 Printer chassis
303 Print region
304 Media advance direction
305 Carriage scan direction
306 Wall
312 Feed roller
313 Forward rotation direction (of feed roller)
323 Passive roller(s)
324 Discharge roller
330 Maintenance station
332 Cap
371 Piece of recording medium
380 Carriage motor
382 Carriage guide rod
383 Encoder
384 Belt
390 Electronics board

The invention claimed is:

1. A method of making an ink cartridge comprising:
- forming an ink cartridge having an ink chamber and an air accumulation chamber therein;
- forming a cap including a vent hole;
- affixing the cap at a first end of the air accumulation chamber and disposing a one way valve at the vent hole for preventing gas from entering the air accumulation chamber through the vent hole when a pressure in the air accumulation chamber is less than a cracking pressure of the one-way valve;
- forming a neck region narrower than the ink chamber and the air accumulation chamber for fluidically connecting the ink chamber and the air accumulation chamber within the ink cartridge; and
- placing a mass within the air accumulation chamber, the mass having a dimension smaller than an interior dimension of the air accumulation chamber such that the mass is movable between the first end and a second end of the air accumulation chamber.

2. The method of claim 1, further comprising forming the mass such that the dimension of the mass is greater than a dimension of the neck region for preventing the mass from entering the ink chamber.

3. The method of claim 1, further comprising forming the mass such that it comprises an average density of less than two grams per cubic centimeter.

4. The method of claim 1, further comprising forming a through-hole through the mass such that a first end of the through-hole faces the first end of the air accumulation chamber and a second end of the through-hole faces the second end of the air accumulation chamber.

5. The method of claim 4, further comprising forming a one way valve at the first end of the through-hole for preventing gas from entering the through-hole through the first end of the through hole.

6. The method of claim 5, wherein the one-way valve at the first end of the through hole is a flapper valve attached on the outside of the first end of the mass.

7. The method of claim 1, wherein the one-way valve is a flapper valve outside the air accumulation chamber.

8. The method of claim 7, wherein forming a cap including a vent hole further includes forming a cap assembly and securing the cap assembly around an outside of the first end of the air accumulation chamber such that the cap assembly forms a cap chamber outside of the flapper valve and prevents any ink that has passed through the vent hole and has accumulated in the cap chamber from passing through the cap assembly.

9. The method of claim 8, further comprising forming a breather membrane in the cap assembly, the breather membrane allowing gas within the cap chamber to pass therethrough but blocking ink from passing therethrough.

10. The method of claim 1, wherein the ink chamber and the air accumulation chamber contains an ink having a density $d_i$ grams/cm$^3$, and further comprising forming the mass such that the mass has an effective density $d_m$ grams/cm$^3$, wherein $0.8d_i<d_m<1.2d_i$.

11. A method of making an ink cartridge comprising:
- forming an ink cartridge having a first chamber for holding ink and a second chamber smaller than the first chamber for holding a smaller portion of the ink and for holding air, including forming a neck region for fluidically connecting the first chamber and the second chamber;
- forming a cap including a vent hole;
- affixing the cap at a first end of the second chamber for evacuating a portion of the air in the second chamber;
- disposing a one way valve at the vent hole for preventing gas from entering the second chamber through the vent hole when a pressure in the second chamber is less than a cracking pressure of the one-way valve; and
- disposing a mass within the second chamber, the mass having a dimension smaller than an interior dimension of the first second chamber such that the mass is movable between the first end and a second end of the second chamber, the mass also having a dimension large enough such that air is forced out of the vent hole when the mass moves in a direction toward the first end of the second chamber.

12. The method of claim 11, wherein the step of forming the neck region comprises forming the neck region proximate the second end of the second chamber.

13. The method of claim 12, wherein the step of forming the neck region further comprises forming the neck region smaller than the mass for preventing the mass from entering the first chamber.

14. The method of claim 13, further comprising forming the mass such that it comprises an average density of less than two grams per cubic centimeter.

15. The method of claim 14, further comprising forming a through-hole through the mass such that a first end of the through-hole faces the first end of the second chamber and a second end of the through-hole faces the second end of the second chamber.

16. The method of claim 15, further comprising disposing a one way valve at the first end of the through-hole for preventing gas from entering the through-hole through the first end of the through hole.

17. The method of claim 16, wherein the one way valve at the first end of the through hole is a flapper valve attached on an outside of the first end of the mass.

18. The method of claim 11, wherein the one way valve at the vent hole is a flapper valve attached on an outside of the second chamber.

19. The method of claim 11, wherein the ink comprises a density $d_i$ grams/$cm^3$, and further comprising forming the mass such that the mass has an effective density $d_m$ grams/$cm^3$, wherein $0.8d_i<d_m<1.2d_i$.

* * * * *